(12) United States Patent
Zhu et al.

(10) Patent No.: US 8,092,778 B2
(45) Date of Patent: Jan. 10, 2012

(54) METHOD FOR PRODUCING A HYDROGEN ENRICHED FUEL AND CARBON NANOTUBES USING MICROWAVE ASSISTED METHANE DECOMPOSITION ON CATALYST

(75) Inventors: Zhonghua John Zhu, Brisbane (AU); Jiuling Chen, Brisbane (AU); Gaoqing Max Lu, Brisbane (AU); Gregory Solomon, Cottlesloe (AU)

(73) Assignee: Eden Energy Ltd., Perth (AU)

( * ) Notice: Subject to any disclaimer, the term of this patent is extended or adjusted under 35 U.S.C. 154(b) by 354 days.

(21) Appl. No.: 12/040,883

(22) Filed: Mar. 1, 2008

(65) Prior Publication Data
US 2008/0210908 A1    Sep. 4, 2008

Related U.S. Application Data

(63) Continuation-in-part of application No. 11/657,212, filed on Jan. 24, 2007.

(51) Int. Cl.
*C01B 3/24*   (2006.01)
*C01B 6/04*   (2006.01)

(52) U.S. Cl. .................... 423/650; 423/447.1
(58) Field of Classification Search ............. 423/650
See application file for complete search history.

(56) References Cited

U.S. PATENT DOCUMENTS

| | | |
|---|---|---|
| 4,435,376 A | 3/1984 | Porter et al. |
| 4,574,038 A | 3/1986 | Wan |
| 5,015,349 A | 5/1991 | Suib |
| 5,131,993 A | 7/1992 | Suib |
| 5,139,002 A | 8/1992 | Lynch et al. |
| 5,205,912 A | 4/1993 | Murphy |
| 5,205,915 A | 4/1993 | Ravelia et al. |
| 5,266,175 A | 11/1993 | Murphy |
| 5,277,773 A | 1/1994 | Murphy |
| 5,366,712 A | 11/1994 | Violante et al. |
| 5,372,617 A | 12/1994 | Kerrebrock et al. |

(Continued)

FOREIGN PATENT DOCUMENTS

AU    5187699 A    2/2000

(Continued)

OTHER PUBLICATIONS

M. Momirlan & T. Veziroglu, "Recent directions of world hydrogen production", Renewable & Sustainable Energy Reviews, 3 (2-3), 1999, pp. 219-231, Elsevier Science Ltd.

(Continued)

*Primary Examiner* — Melvin Mayes
*Assistant Examiner* — Kenneth Vaden
(74) *Attorney, Agent, or Firm* — Stephen A. Gratton

(57) ABSTRACT

A method for producing a hydrogen enriched fuel and carbon nanotubes includes the steps of providing a flow of methane gas, and providing a catalyst mixture comprising a Fe based catalyst and carbon. The method also includes the steps of pretreating the catalyst mixture using microwave irradiation and exposure to $CH_4$, heating the catalyst mixture and the methane gas using microwave irradiation at a selected microwave power, directing the flow of methane gas over the catalyst mixture, and controlling the microwave power to produce a product gas having a selected composition and the carbon nanotubes. For producing multi walled carbon nanotubes (MWNTs) only a flow of methane gas into the reactor is required. For producing single walled carbon nanotubes (SWNTs), a combination of hydrogen gas and methane gas into the reactor is required.

15 Claims, 7 Drawing Sheets

U.S. PATENT DOCUMENTS

| | | | |
|---|---|---|---|
| 5,516,967 A | 5/1996 | Pandey et al. | |
| 5,525,322 A | 6/1996 | Wilms | |
| 5,972,175 A | 10/1999 | Tanner et al. | |
| 6,165,438 A | 12/2000 | Willms | |
| 6,509,000 B1 | 1/2003 | Choudhary et al. | |
| 6,592,723 B2 | 7/2003 | Cha | |
| 6,759,025 B2 | 7/2004 | Hong et al. | |
| 6,783,632 B2 | 8/2004 | Cha | |
| 6,875,417 B1 * | 4/2005 | Shah et al. | 423/650 |
| 6,994,907 B2 | 2/2006 | Resasco et al. | |
| 6,998,103 B1 | 2/2006 | Phillips et al. | |
| 7,001,586 B2 | 2/2006 | Wang et al. | |
| 7,011,768 B2 | 3/2006 | Jensen et al. | |
| 7,094,386 B2 | 8/2006 | Resasco et al. | |
| 7,094,679 B1 | 8/2006 | Li et al. | |
| 7,119,240 B2 | 10/2006 | Hall et al. | |
| 7,625,544 B2 * | 12/2009 | Liu et al. | 423/447.3 |
| 2002/0103405 A1 | 8/2002 | Hatanaka | |
| 2002/0146366 A1 | 10/2002 | Cha | |
| 2003/0129122 A1 * | 7/2003 | Chen et al. | 423/447.3 |
| 2003/0206855 A1 | 11/2003 | Cha | |
| 2004/0265223 A1 | 12/2004 | Etievant et al. | |
| 2005/0063900 A1 | 3/2005 | Wang et al. | |
| 2005/0065391 A1 | 3/2005 | Gattis et al. | |
| 2005/0288541 A1 | 12/2005 | Sherwood | |
| 2006/0021510 A1 * | 2/2006 | Henley et al. | 96/143 |
| 2006/0037432 A1 * | 2/2006 | Deevi et al. | 75/255 |
| 2006/0163054 A1 | 7/2006 | Spitzl et al. | |
| 2006/0269669 A1 * | 11/2006 | Jiang et al. | 427/249.1 |
| 2007/0031299 A1 * | 2/2007 | Jiang et al. | 422/129 |
| 2007/0266825 A1 * | 11/2007 | Ripley et al. | 75/330 |
| 2008/0156630 A1 | 7/2008 | Lee et al. | |
| 2008/0159944 A1 * | 7/2008 | Park | 423/447.3 |
| 2008/0173532 A1 | 7/2008 | Zhu | |
| 2008/0181845 A1 | 7/2008 | Zhu | |
| 2009/0205254 A1 | 8/2009 | Zhu et al. | |

FOREIGN PATENT DOCUMENTS

| | | |
|---|---|---|
| CA | 2031959 | 6/1991 |
| CA | 2084196 A1 | 2/1992 |
| CA | 2103330 A1 | 6/1994 |
| CA | 2103211 A | 6/1996 |
| CA | 2 338 494 A1 | 2/2000 |
| CA | 2 453 841 A1 | 1/2003 |
| EP | 1 423 331 A1 | 2/1976 |
| EP | 0 435 591 A2 | 7/1991 |
| EP | 0 600 738 A1 | 6/1994 |
| EP | 0 601 797 A1 | 6/1996 |
| EP | 188194 | 1/2008 |
| FR | 2 827 591 A1 | 1/2003 |
| JP | 6219770 A | 8/1994 |
| JP | 2004-324004 A | 11/2004 |
| JP | 2007000774 A | 1/2007 |
| KR | 20060118766 A | 11/2006 |
| MX | 9307285 A1 | 6/1994 |
| MX | 9307330 A1 | 7/1994 |
| WO | WO 92/02488 | 2/1992 |
| WO | WO 00/05167 | 2/2000 |
| WO | WO 01/85612 A3 | 11/2001 |
| WO | WO 03/008328 A | 1/2003 |
| WO | WO 2005/063615 A1 | 7/2005 |
| WO | WO 2006/069254 A3 | 6/2006 |
| WO | WO 2006/107144 A1 | 10/2006 |
| WO | WO 2006107144 A1 * | 10/2006 |
| WO | WO 2006/123883 A1 | 11/2006 |
| WO | WO 2006/135378 A3 | 12/2006 |
| WO | WO 2007/033438 A1 | 3/2007 |
| WO | WO 2007/142728 A3 | 12/2007 |
| WO | WO 2008/090466 A2 | 7/2008 |
| WO | WO 2008/090467 A2 | 7/2008 |
| WO | WO 2008/127380 A2 | 10/2008 |
| WO | WO 2009/145936 A2 | 3/2009 |
| WO | WO 2009103017 A1 | 8/2009 |

OTHER PUBLICATIONS

John N. Armor, "The multiple roles for catalysis in the Production of H2", Applied Catalysis: A General, 176 (2), 1999, pp. 159-175, Elsevier Science B.V.

Menderes Levent et al., "Production of hydrogen-rich gases from steam reforming of methane in an automatic catalytic microreactor", International Journal of Hydrogen Energy, 28 (9), pp. 945-959, Elsevier Science Ltd.

Rong-Fang Horng et al., "Investigation of the production of hydrogen rich gas in a plasma converter for motorcycle applications", Energy Conversion and Management 47, 2006, pp. 2155-2166, Elsevier Ltd.

Annika T. Nielsen et al., "Hydrogen production from organic waste", International Journal of Hydrogen Energy 26, 2001, pp. 547-550, Elsevier Science Ltd.

O. Khaselev et al., "High-efficiency integrated multijunction photovoltaic/electrolysis systems for hydrogen production", International Journal of Hydrogen Energy, 26 (2), 2001, pp. 127-132, Elsevier Science Ltd.

Chanjuan Xing et al., Band structure-controlled solid solution of Cd1-xZnxS photocatalyst for hydrogen production by water splitting, International Journal of Hydrogen Energy 31, 2006, pp. 2018-2024.

T. V. Choudhary et al., "Hydrogen Production via Catalytic Decomposition of Methane", Journal of Catalysis 199 (1), 2001, pp. 9-18, Academic Press.

Nazim Muradov, "Hydrogen via methane decomposition: an applicaiton for decarbonization of fossil fuels", International Journal of Hydrogen Energy, 2001, pp. 1165-1175, Elsevier Science Ltd.

Naresh Shah et al., "Hydrogen Production by Catalytic Decomposition of Methane", Energy & Fuels, 15 (6), 2001, pp. 1528-1534, American Chemical Society.

Pamela L. Spath et al., "Life Cycle Assessment of Hydrogen Production via Natural Gas Steam Reforming", Technical Report, National Renewable Energy Laboratory, Golden, CO, 2001, pp. 1-33.

Dr. Joan M. Ogden, "Review of Small Stationary Reformers for Hydrogen Production", Report for the International Energy Agency Agreement, 2001, pp. 1-64, Princeton University, NJ.

M. A. Rosen, "Thermodynamic Comparison of Hydrogen Production Processes", International Journal of Hydrogen Energy, vol. 21, No. 5, 1996, pp. 349-365, Elsevier Science Ltd.

M. G. Poirier et al. "Catalytic Decomposition of Natural Gas to Hydrogen for Fuel Cell Applications", International Journal of Hydrogen Energy, vol. 22, No. 4, 1997, pp. 429-433, Elsevier Science Ltd.

M. A. Ermakova et al., "NiSiO2 and Fe/SiO2 catalysts for production of hydrogen & filamemtous carbon via methane decomposition", Catalysis Today 77, 2002, pp. 225-235, Elsevier Science Ltd.

Sakae Takenaka, "Methane Decomposition into Hydrogen and Carbon Nanofibers over Supported PD-Ni catalysts", J. Phys. Chem B, 2004, pp. 7656-7664, American Chemical Society.

Tatsumi Ishihara et al., "CH4 Decomposition with a Pd-Ag Hydrogen-Permeating Membrane Reactor for Hydrogen Production at Decreased Temp", Ind. Eng. Chem Res. 41, American Chemical Society, 2002, pp. 3365-3369.

Heiko Will et al., "Microwave-Assisted Heterogeneous Gas-Phase Catalysis", Chemical Engineering Technology, 2004, pp. 113-122, Wiley,VCH.

Hiroshi Nagazoe et al., "Characteristics of Methane Conversion under Combined Reactions of Solid Catalyst with Microwave Plasma", Journal of Chemical Engineering of Japan, vol. 39 No. 3, 2006, pp. 314-320.

Jian Huang et al., "Activation of methane in microwave plasmas at high pressure", Res. Chem. Intermed, vol. 27, No. 6, 2001, pp. 643-658.

Wonihl Cho et al., "Plasma catalytic reaction of natural gas to C2 product over Pd-NIO/Al2O3 and Pt-Sn/Al2O3 catalysts", Res. Chem. Intermed, vol. 28 No. 4, 2002, pp. 343-357.

J. R. Thomas Jr., Particle size effect in microwave-enhanced catalysis, Catalysis Letters 49, J. C. Baltzer AG, Science Publishers, Oct. 19, 1997, pp. 137-141.

Xunli Zhang et al. "Apparent equilibrium shifts and hot-spot formation for catalytic reactions induced by microwave dielectric heating", Chem. Commun., 1999, pp. 975-976.

Carolina Marun et al., "Catalytic Oligomerization of Methane via Microwave Heating", J. Phys. Chem A, 1999, pp. 4332-34340, American Chemical Society.

Jianhua Tong et al., "Pure hydrogen production by methane steam reforming with hydrogen-permeable membrane reactor", Catalysis Today 111, 2006, pp. 147-152, Elsevier Science Ltd.

U.S. Appl. No. 12/030,970, filed on Feb. 14, 2008.

Kui Zhang et al., "Conversion of Greenhouse Gases to Synthesis Gas and Higher Hydrocarbons", Energy & Fuels 2001, 15, 2001 American Chemical Society, pp. 395-402.

Kui Zhang et al. Direct Conversion of Greenhouse Gases to synthesis Gas and $C_4$ Hydrocarbons over Zeolite HY Promoted by A Dielectric-Barrier Discharge, Ind. Eng. Chem. Res. 2002, 41, 2002 American Chemical Society, pp. 1462-1468.

PCT International Application No. PCT/IB2008/000538 Search Report and Written Opinion dated Aug. 29, 2008, pp. 1-9.

PCT International Application No. PCT/IB2008/000508 Search Report and Written Opinion dated Aug. 26, 2008, pp. 1-14.

Wonihl Cho et al., "Conversion of natural gas to hydrogen and carbon black by plasma and application of plasma carbon black", Catalysis Today 98 (2004) no month, Elsevier, pp. 633-638.

David O. Conney and Zhenpeng Xi, "Production of Hydrogen From Methane/Steam In a Microwave Irradiated Char-Loaded Reactor", Fuel Science & Technology Int'l, 14(8), pp. 1111-1141 (1996) no month.

PCT Search Report and Written Opinion from International application No. PCT/US 09/34142 dated Jul. 10, 2009, pp. 1-7.

Office Action from U.S. Appl. No. 11/657,212 dated Sep. 2, 2009, pp. 1-14.

Office Action from U.S. Appl. No. 11/657,212 dated Jun. 24, 2010, pp. 1-19.

Office Action from U.S. Appl. No. 11/657,212 dated Feb. 2, 2010, pp. 1-16.

Office Action from U.S. Appl. No. 11/657,299 dated Apr. 14, 2010, pp. 1-14.

Notice of Allowance from U.S. Appl. No. 11/657,299 dated Jul. 21, 2011, pp. 1-10.

Office Action from U.S. Appl. No. 11/657,299 dated Mar. 28, 2011, pp. 1-24.

Office Action from U.S. Appl. No. 11/657,299 dated Oct. 26, 2010, pp. 1-16.

Office Action from U.S. Appl. No. 11/657,212 dated May 10, 2011, pp. 1-19.

Office Action from U.S. Appl. No. 11/657,212 dated Dec. 1, 2010, pp. 1-7.

Office Action from U.S. Appl. No. 12/030,970 dated Jul. 5, 2011, pp. 1-11.

International application No. PCT/US2009/034142, Preliminary Report on Patentability dated Aug. 25, 2010, pp. 1-6.

Russian Patent Application Serial No. 2009128365/05, translation of Office Action (associate's short comments) Nov. 21, 2010, pp. 1-2.

Russian Patent Application Serial No. 2009128365/05, translation of Official Grant Notification issued by the Russian Patent Office on Jan. 13, 2011, p. 1.

New Zealand Patent Application Serial No. 579553, Examination Report dated Sep. 17, 2010, p. 1.

New Zealand Patent Application Serial No. 579553, Examination Report dated Feb. 3, 2011, p. 1.

New Zealand Patent Application Serial No. 579552, Examination Report dated Sep. 17, 2010, p. 1.

Russian Patent Application Serial No. 2009128364/05 translation of Office Action issued by the Russian Patent Office dated Dec. 2010, pp. 1-2.

Examiner's first report on Australia Patent Application Serial No. 2008208614 dated Feb. 25, 2011, pp. 1-2.

Examination Report on New Zealand Patent Application Serial No. 579553 dated Feb. 3, 2011, pp. 1-2.

First Office Action from the State Intellectual Property Office of the PRC in Patent Application No. 200880006502.8 (English translation), pp. 1-11.

* cited by examiner

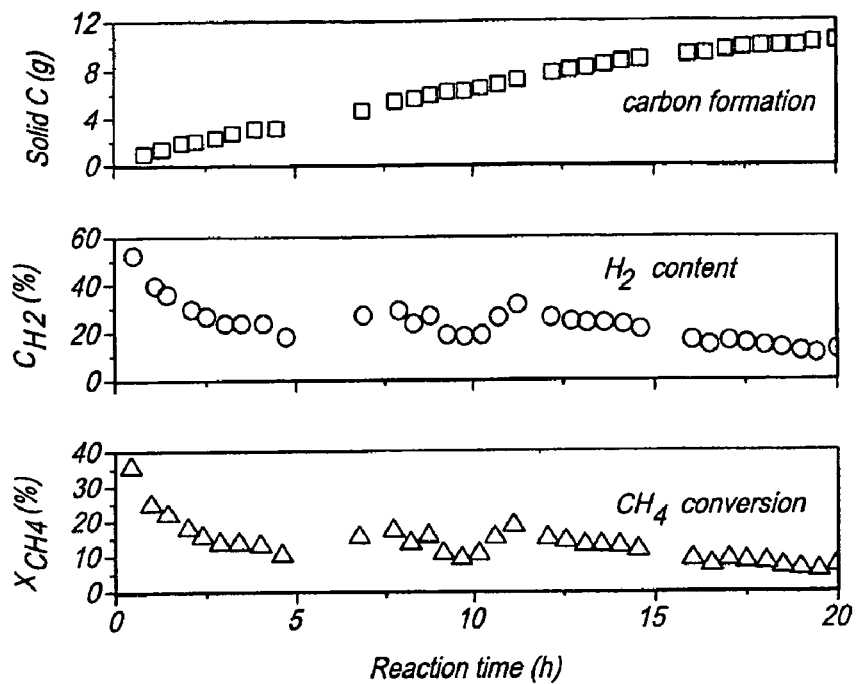
FIG. 7
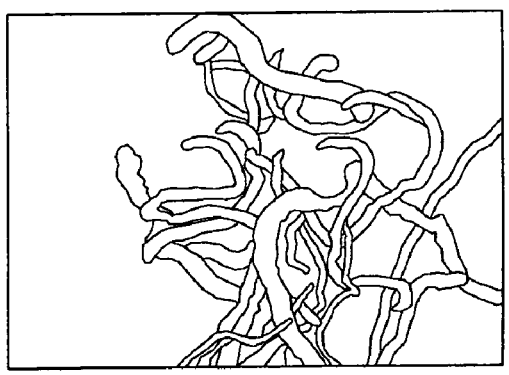 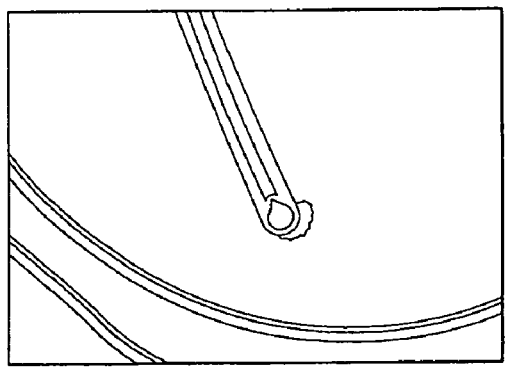
FIG. 8A         FIG. 8B

METHOD FOR PRODUCING A HYDROGEN ENRICHED FUEL AND CARBON NANOTUBES USING MICROWAVE ASSISTED METHANE DECOMPOSITION ON CATALYST

CROSS REFERENCE TO RELATED APPLICATIONS

This application is a continuation in part of Ser. No. 11/657,212 filed on Jan. 24, 2007, Publication No. US-2008-0173532-A1. This application is related to Ser. No. 11/657,299, filed Jan. 25, 2007, Publication No. US-2008-0181845-A1; and to Ser. No. 12/030,970, filed Feb. 14, 2008.

FIELD OF THE INVENTION

This invention relates generally to the production of hydrogen fuels, and particularly to a method for producing a hydrogen enriched fuel suitable for use as an alternative fuel along with carbon nanotubes.

BACKGROUND OF THE INVENTION

Gaseous alternative fuels, such as hydrogen and natural gas, are valued for their clean burning characteristics in motor vehicle engines. Various processes have been developed for producing hydrogen. These processes include electrolysis, exotic water splitting, and separation from industrial waste streams.

Hydrogen can also be produced by reforming natural gas. Typically, a multi-step process is used to convert a hydrocarbon fuel, such as methane, propane or natural gas, into a high purity hydrogen gas stream. The steps of the process typically include (1) synthesis gas generation, (2) water-gas shift reaction, and (3) gas purification (e.g., CO and $CO_2$ removal). The hydrogen gas stream can then be used for a variety of purposes including mixture with other gases to produce an alternative fuel.

For example, a particularly clean burning gaseous alternative fuel known as HYTHANE comprises a mixture of hydrogen and natural gas. The prefix "Hy" in HYTHANE is taken from hydrogen. The suffix "thane" in HYTHANE is taken from methane, which is the primary constituent of natural gas. HYTHANE is a registered trademark of Eden Innovations LLC. HYTHANE typically contains about 5% to 7% hydrogen by energy, which corresponds to 15% to 20% hydrogen by volume.

For producing hydrogen, one type of reformer called a "steam reformer" uses a hydrocarbon fuel and steam ($H_2O$). In the steam reformer, the hydrocarbon fuel is reacted in a heated reaction tube containing steam ($H_2O$) and one or more catalysts. In general, the production of a high purity hydrogen gas by reforming requires high temperatures (800-900° C.). Steam reforming also produces impurities, particularly CO and $CO_2$, which if not removed, are ultimately released to the atmosphere.

The production of a high purity hydrogen gas by reforming also requires large capital costs for the equipment, and large operating costs, particularly for power. In addition to these shortcomings, it is difficult to manufacture a compact embodiment of a steam reformer. It would be advantageous for a hydrogen production system to have a relatively compact size, such that alternative fuels could be produced at a facility the size of a gas station, rather than at a facility the size of a refinery.

Another process for producing hydrogen from natural gas involves the thermal decomposition of methane. For example, methane decomposes into hydrogen by the reaction:

$$CH_4 = C + 2H_2$$

For example, the thermal decomposition of natural gas has been used in the "Thermal Black Process" for producing carbon black and hydrogen. Using thermal decomposition, the energy requirements per mole of hydrogen produced (37.8 kJ/mol $H_2$) is considerably less than the energy requirements of the steam reforming process (63.3 kJ/mol $H_2$). However, the process still requires high temperatures (e.g., 1400° C.), high equipment costs, and high energy expenditures.

Recently, thermal decomposition of natural gas has been investigated in combination with various catalysts, which allow the reaction to proceed at lower temperatures. For example, U.S. Pat. No. 7,001,586 B2, to Wang et al. discloses a thermal decomposition process in which two catalysts having the formula $Ni_xMg_yO$ and $Ni_xMg_yCu_zO$, respectively, are used to decompose methane to carbon and hydrogen. The former needs a lower temperature from about 425° C. to 625° C., but the lifetime is shorter and the activity is lower. The latter's lifetime is longer and the activity is higher. However, because the energy for the reaction was provided by conventional heating, these processes require high energy expenditures to heat the wall of the reactor, the gas and the catalysts.

It would be advantageous for a hydrogen production system to be capable of performance at lower energy expenditures, with a variety of catalysts active for long periods, and with minimal carbon emissions (e.g., CO, $CO_2$). In addition, it would be advantageous for a hydrogen production system to have a size and configuration adaptable to the production of alternative fuels containing hydrogen. The present disclosure is directed to a method and a system for producing a hydrogen enriched fuel that overcomes many of the shortcomings of prior art hydrogen production systems.

The foregoing examples of the related art and limitations related therewith are intended to be illustrative and not exclusive. Other limitations of the related art will become apparent to those of skill in the art upon a reading of the specification and a study of the drawings. Similarly, the following embodiments and aspects thereof are described and illustrated in conjunction with a system and method, which are meant to be exemplary and illustrative, not limiting in scope.

SUMMARY OF THE INVENTION

A method for producing a hydrogen enriched fuel includes the steps of providing a flow of methane gas, providing a catalyst, selectively heating the catalyst instead of the reactor walls and the methane gas using microwave irradiation at a selected microwave power, directing the flow of methane gas over the catalyst, and controlling the microwave power to produce a product gas having a selected composition.

The method can be performed in a reactor having a reaction chamber with microwave transparent walls. In addition, the catalyst can comprise a metal, such as a Ni-based compound prepared by coprecipitation. On the surface of the catalyst reactions occur in which methane ($CH_4$) dissociates into hydrogen ($H_2$) and solid carbon (C) in the form of fibrous carbon. In addition, some of the methane gas fails to react (methane slip) such that the product gas comprises methane and hydrogen. The catalyst is selected and formulated to remain stable under operating conditions (e.g., gas flow rate, microwave power, catalyst amount), such that costs are minimized. In addition, the catalyst maintains active characteristics through many hours of reactions.

The flow of methane gas and the microwave power can be controlled such that the composition of the product gas approximates the chemical composition of HYTHANE. For example, the product gas can comprise from about 20% to 30% hydrogen by volume, and from about 70% to 80% methane by volume. Advantageously, the product gas contains almost no carbon impurities (e.g., CO, $CO_2$), as carbon is converted to solid fibrous carbon which drops out of the product gas as a useful by-product. In addition, the product gas contains only negligible amounts of higher order hydrocarbons (e.g., $C_2H_4$, $C_2H_2$, $C_3H_6$, $C_3H_8$, $C_3H_4$).

A system for producing a hydrogen enriched fuel includes a methane gas source configured to provide a methane gas flow. The system also includes a reactor having a reaction chamber in flow communication with the methane gas source configured to contain a catalyst, and to circulate the methane gas in contact with the catalyst. The system also includes a microwave power source configured to heat the catalyst in the reaction chamber to form a product gas having a selected volumetric percentage of hydrogen and methane.

In an alternate embodiment of the method, the product gas is further processed to recover hydrogen in substantially pure form. To recover substantially pure hydrogen, the product gas can be flowed under a vacuum through a Pd/Ag membrane coated on a porous metal or ceramic plate.

In another alternate embodiment of the method, both a hydrogen enriched fuel and carbon nanotubes (CNTs) are produced. For producing both a hydrogen enriched fuel and carbon nanotubes (CNTs), the catalyst comprises a mixture of an Fe-based compound and carbon, which is pretreated in the reactor by microwave irradiation in the presence of $CH_4$ or $H_2$ for one to several minutes. For producing multi walled carbon nanotubes (MWCNs) only a flow of methane gas into the reactor is required. For producing single walled carbon nanotubes (SWCNs), a combination of hydrogen gas and methane gas into the reactor are required.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

FIG. 7 is an overlaid graph illustrating carbon formation, $H_2$ content and $CH_4$ conversion for an alternate embodiment method of Example 4 in which both a hydrogen enriched fuel and carbon nanotubes are produced;

FIG. 8A is a transmission electron microscopic image illustrating carbon nanotubes produced by the method of Example 4;

FIG. 8B is a transmission electron microscopic image illustrating a carbon nanotube produced by the method of Example 4;

DETAILED DESCRIPTION OF THE PREFERRED EMBODIMENTS

The following definitions are used in the present disclosure. HYTHANE means a hydrogen enriched alternative fuel comprised of hydrogen and methane and impurities included in hydrogen and natural gas.

Methane slip means unreacted methane which passes through a system without reacting.

Microwave irradiation means electromagnetic irradiation in the range of 0.3 to 300 GHz.

Carbon nanotubes (CNTs) are allotropes of carbon having a nanostructure where the length to diameter ratio exceeds 1,000,000. The diameter of a carbon nanotube (CNT) is on the order of a few nanometers, while the length is on the order of millimeters. Carbon nanotubes (CNTs) are generally cylindrical in shape and have a fullerene cap. Carbon nanotubes (CNTs) can have a single wall or multiple walls. A single walled nanotube (SWNT) can have a diameter of close to 1 nanometer. A multi walled nanotube (MWNT) includes multiple layers of graphite rolled in on themselves to form a tube shape. Single walled nanotubes (SWNTs) are generally preferred for most applications because they have fewer defects and are stronger and more conductive than multi walled nanotubes (MWNTs). Carbon nanotubes (CNTs) can be used for a variety of applications including nanoscale electronic devices, high strength materials, field emission devices, and gas storage.

Method

Figure 1:
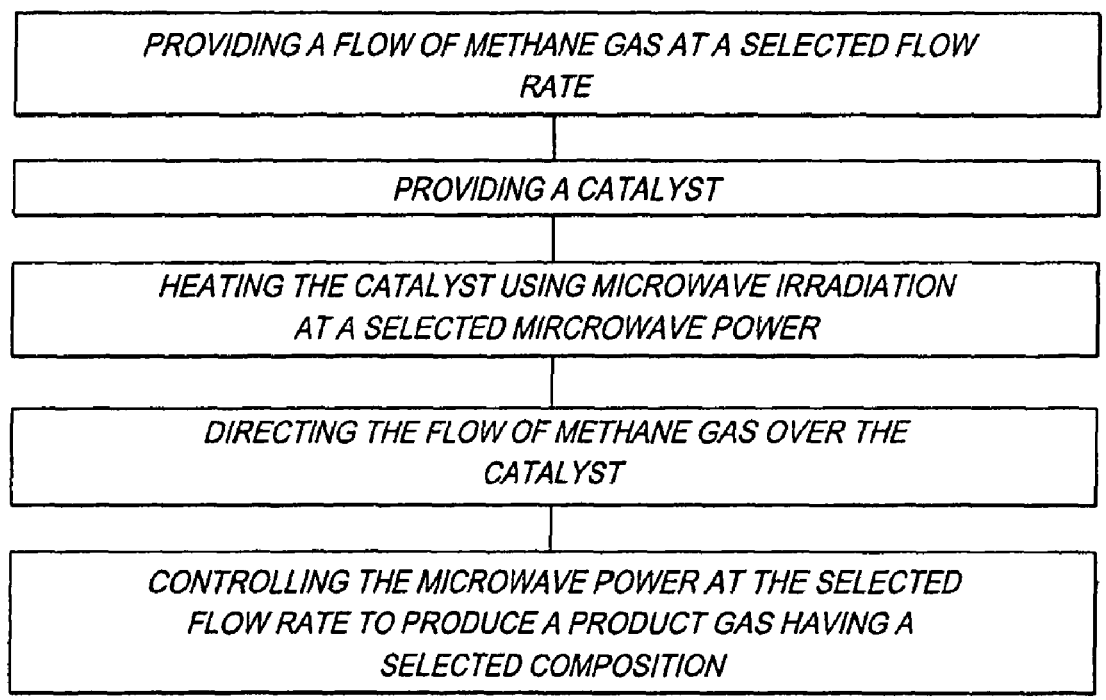
FIG. 1 is a flow diagram illustrating steps in a method for producing a hydrogen enriched fuel.

Referring to FIG. 1, steps in a method for producing a hydrogen enriched fuel are illustrated. The first step comprises "providing a flow of methane gas at a selected flow rate". By way of example, the methane gas can be in the form of pure methane gas. Alternately, the methane gas can be in the form of natural gas obtained from a "fossil fuel" deposit. Natural gas is typically about 90+% methane, along with small amounts of ethane, propane, higher hydrocarbons, and "inerts" like carbon dioxide or nitrogen. In addition, the methane gas can be supplied from a tank (or a pipeline) at a selected temperature and pressure. Preferably, the methane gas is provided at about room temperature (20 to 25° C.), and at about atmospheric pressure (1 atmosphere). Further, the methane gas can be provided at the selected flow rate. In the examples to follow, the selected flow rate of the methane gas is about 120 ml/minute (STP).

As also shown in FIG. 1, the method includes the step of "providing a catalyst". Preferably, the catalyst is provided in the form of particles having a diameter of from 74 μm to 140 μm. In addition, the catalyst is preferably contained on a holder, which allows the methane gas to flow freely along the surfaces of the catalyst particles. In addition, catalysts in the form of metal oxides can be pre-treated using $H_2$ to reduce the metal oxide to a metal.

A preferred metal for the catalyst comprises Ni, or an alloy containing Ni. For example, the metal can comprise NiAl, or Ni doped with Cu, Pd, Fe, Co, or an oxide such as MgO, ZnO, $Mo_2O_3$ or $SiO_2$. Specific catalysts include Ni81Al, Ni93Al, Ni77Cu16Al, Ni54Cu27Al and Ni83Mg6Al. In addition, nickel based catalyst precursors can be prepared by coprecipitation from a mixed aqueous solution of nitrates with sodium carbonate.

The following Table I provides information on catalyst preparation of nickel-based precursors for the above catalysts. These catalysts were prepared by coprecipitation from a mixed aqueous solution of nitrates with sodium carbonate.

TABLE 1

| | Catalyst Preparation | |
|---|---|---|
| | Catalyst Composition | |
| 1 | Ni81Al | 81 wt. % NiO-19 wt. % $Al_2O_3$ |
| 2 | Ni93Al | 93 wt. % NiO-7 wt. % $Al_2O_3$ |
| 3 | Ni77Cu16Al | 77 wt. % NiO-16 wt. % CuO-7 wt. % $Al_2O_3$ |
| 4 | Ni54Cu27Al | 54 wt. % NiO-27 wt. % CuO-9 wt. % $Al_2O_3$ |
| 5 | Ni83Mg6Al | 83 wt. % NiO-6 Wt. % MgO-11 wt. % $Al_2O_3$ |

However, rather than Ni or an alloy thereof, the catalyst can comprise another metal, such as a metal selected from group VIII of the periodic table including Fe, Co, Ru, Pd and Pt. In any case the catalyst is selected and formulated to remain stable under reaction conditions for long periods of time. In the examples to follow there was no indication that the catalyst was going to be deactivated, even after over 16 hours of reaction time.

As also shown in FIG. 1, the method includes the step of "heating the catalyst using microwave irradiation at a selected microwave power". This step can be performed using a conventional microwave generator and microwave circulator configured to irradiate the catalyst with microwave irradiation. In general, microwave energy selectively heats the metal catalyst instead of the reactor wall and the methane gas, thus significantly saving the energy consumption of the catalyst/microwave heating process.

Heating the catalyst by microwave irradiation provides the following advantages:
a.) volumetric heating, fast,
b.) selectively heating the catalyst instead of the reactor wall and the methane gas, high efficiency,
c.) low temperature gradient,
d.) hot spot to prevent serial reaction of product,
e.) may also influence catalytic reaction by changing the electronic properties of the catalyst in the microwave electromagnetic field.

In the examples to follow, the microwave generator was operated at a power of about 250 watts, and the catalyst was heated to a temperature of from about 600 to 700° C. However, it is to be understood that the method can be practiced at a microwave power that is selected to achieve a desired product gas composition. For example, a representative range for the microwave power can be from 150 watts to 300 watts. Also in the examples to follow, the microwave generator was operated at a frequency of 2.45 GHz. For performing microwave irradiation, the reactor and the holder for the catalyst must be made of a microwave transparent material able to withstand high temperatures. One suitable material for the reactor and the holder comprises quartz.

As also shown in FIG. 1, the method includes the step of "directing the flow of methane gas over the catalyst". This step can be performed by placing the catalyst in a microwave transparent reactor having a reaction chamber configured to contain the catalyst, and to direct the flow of methane gas over the catalyst.

As also shown in FIG. 1, the method includes the step of "controlling the microwave power at the selected flow rate to produce a product gas having a selected composition". This step can be performed using a microwave generator having variable power controls.

System

Figure 2:
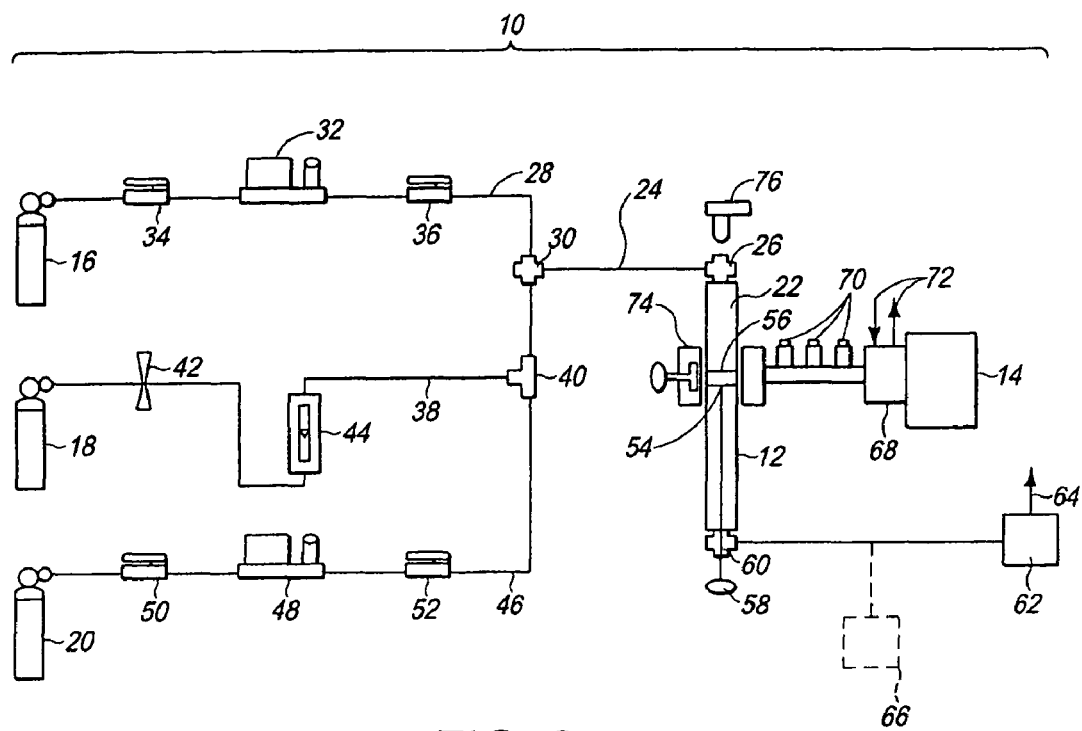
FIG. 2 is a schematic drawing of a system for producing a hydrogen enriched fuel.

Referring to FIG. 2, a system 10 for producing a hydrogen enriched fuel, in accordance with the previously described method, is illustrated. The system 10 includes a reactor 12, and a microwave generator 14. The system also includes a methane supply 16, a hydrogen supply 18, and an inert gas supply 20 in flow communication with the reactor 12.

The reactor 12 (FIG. 2) can comprise a conventional tube reactor made of a microwave transparent material, such as quartz. In addition, the reactor 12 includes a sealed process chamber 22 having an inlet 26 in flow communication with a supply conduit 24.

The supply conduit 24 (FIG. 2) is in flow communication with a methane conduit 28 via a union 30, which is in flow communication with the methane supply 16. In addition, the methane conduit 28 includes a methane mass flow controller 32 configured to remotely control the flow of methane gas into the reaction chamber 22, and shut off valves 34, 36 on either side of the methane mass flow controller 32. In the illustrative embodiment, the methane supply 16 is configured to provide pure methane. However, it is to be understood that the system 10 can include, and the method can be practiced, using another methane source, such as natural gas.

The supply conduit 24 (FIG. 2) is also in flow communication with a hydrogen conduit 38 via a union 40, which is in flow communication with the hydrogen gas supply 18. The hydrogen conduit 38 includes a needle valve 42 configured to manually regulate the flow of hydrogen gas into the reaction chamber 22, and a rotameter 44 configured to measure the hydrogen flow.

The supply conduit 24 (FIG. 2) is also in flow communication with an inert gas conduit 46, which is in flow communication with the inert gas supply 20. The inert gas can comprise Ar or another inert gas, such as He or Ne. The inert gas conduit 46 also includes an inert gas mass flow controller 48 configured to remotely control the flow of inert gas into the reaction chamber 22, and shut off valves 50, 52 on either side of the inert gas mass flow controller 48. The inert gas conduit 46 can be used to purge the reaction chamber 22.

In addition to the reaction chamber 22 (FIG. 2), the reactor 12 includes a holder 54 configured to hold a catalyst 56 in the reaction chamber 22. As with the reactor 12 and the walls of the reaction chamber 22, the holder 54 is made of a microwave transparent material. In addition, the holder 54 has a cup like configuration with openings that permit gas flow through the holder 54 and around the catalyst 56. The holder 54 also includes a handle 58 configured to permit removal of the holder 54 and the catalyst 56 from the reaction chamber 22.

The reactor 12 (FIG. 2) also includes an outlet 60 in flow communication with the reaction chamber 22. The outlet 60 of the reactor 12 is configured to exhaust the product gas formed in the reaction chamber 22. The outlet 60 is in flow communication with a gas chromatograph 62 configured to analyze the chemical composition of the product gas exiting the reaction chamber 22. In addition, the gas chromatograph 62 is in flow communication with a vent 64 configured to vent product gases, which have been analyzed to the atmosphere.

The outlet 60 of the reactor 12 can also be in flow communication with a product gas storage vessel 66 configured to store the product gas for future use.

The microwave generator 14 (FIG. 2) of the system 10 is configured to direct microwave radiation through a microwave circulator 68, and through a three stub tuner 70, to the catalyst 56 held on the holder 54 in the reaction chamber 22. The microwave circulator 68 also includes a cooling system 72. In addition, a microwave adjust plug 74 is configured to remotely adjust the reflected power of the microwave generator 14.

The system 10 (FIG. 2) also includes an infrared temperature sensor 76 configured to measure the temperature of the catalyst 56.

Example 1

Using the previously described method (FIG. 1), and the previously described system 10 (FIG. 2), a hydrogen enriched fuel comprising $CH_4$ and $H_2$ was produced under the following conditions.

A. Pure methane gas (99.7% purity) was supplied through the methane supply conduit 28 to the reactor 12 (FIG. 2).
B. Methane flow rate (i.e., selected flow rate in FIG. 1): 120 ml/minute.
C. Catalyst 56 (FIG. 2): Ni54Cu27Al.
D. The catalyst 56 (FIG. 2) was initially reduced for a period of several minutes in $H_2$ plasma at a microwave power of 160 W. For reducing the catalyst 56 (FIG. 2), a flow of $H_2$ gas was supplied through the hydrogen supply conduit 38 (FIG. 2) to the reaction chamber 22 (FIG. 2), and irradiated with microwave energy from the microwave generator 14 (FIG. 2) to form a plasma.
E. Reaction pressure: atmospheric pressure (1 atm).
F. Products (hydrogen enriched fuel): $H_2$, solid carbon C and unreacted $CH_4$, by the reaction $CH_4=C+2H_2$. SEM (scanning electron microscopy) pictures of the solid carbon demonstrate that the carbon is in the form of fibrous carbon rather than carbon black. In addition, the fibrous carbon is a useful by-product that can be used for other applications.
G. Microwave power applied to the catalyst: 250 W.
H. Methane conversion: approximately 20%.
I: Unreacted methane: approximately 80%.
J. Production rate: about 48 ml/minute of $H_2$ at stable conditions.
K. In Example 1 the only energy consumed was in heating the catalyst. Accordingly the process is energy efficient.

Figure 3:
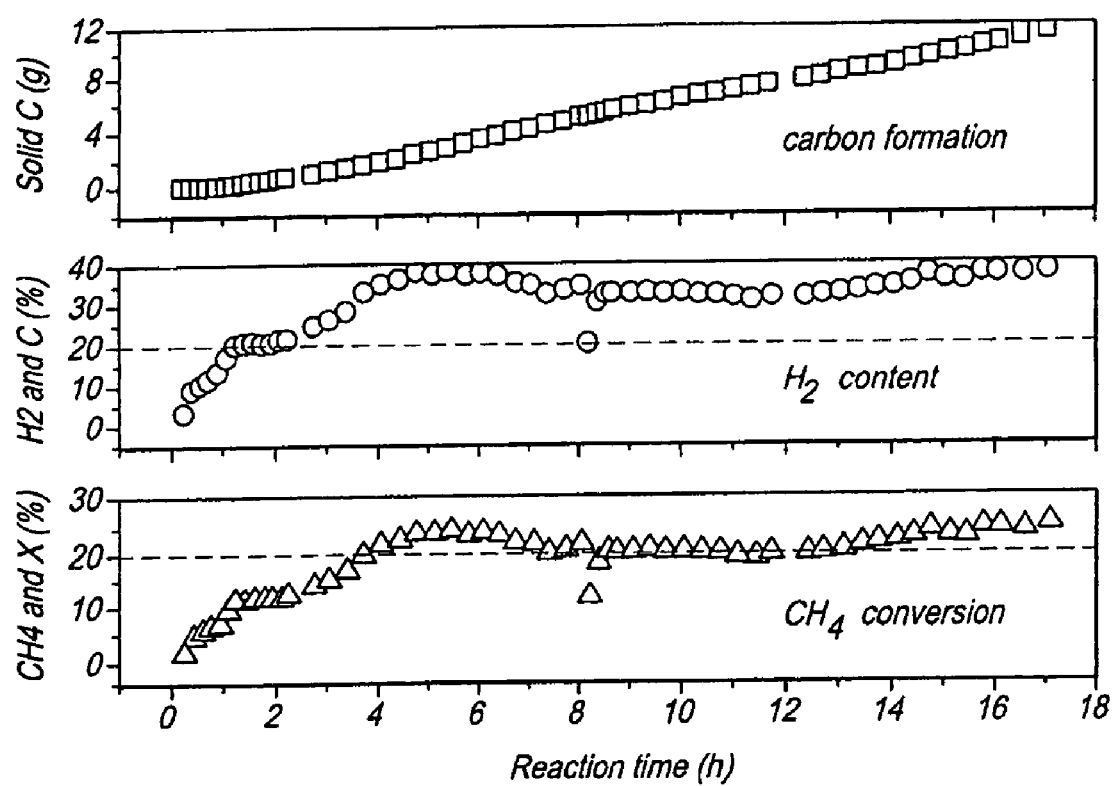
FIG. 3 is an overlaid graph illustrating $CH_4$ conversion, $H_2$ content, and carbon formation versus reaction time for Example 1 using a Ni54Cu27Al catalyst.

FIG. 3 illustrates the results of $CH_4$ conversion assisted by microwave heating using Ni54Cu27Al as the catalyst 56 (FIG. 2). Example 1 was a continuous process. In FIG. 3, the reaction time in hours (h) denotes the length of time that the process was performed.

In FIG. 3 there are three separate graphs. The lower graph plots the conversion rate "X %" of the $CH_4$ on the y-axis (expressed as a volume percentage) versus the reaction time in hours on the x-axis. The middle graph plots the content "C %" of $H_2$ on the y-axis (expressed as a volume percentage) versus the reaction time in hours on the x-axis. The upper graph plots the amount of solid carbon (Solid C (g)) on the y-axis (expressed in grams) versus the reaction time in hours on the x-axis.

Example 2

Example 2 was performed using the same conditions as outlined above for Example 1 but with the catalyst comprising Ni81Al rather than Ni54Cu27Al.

Figure 4:
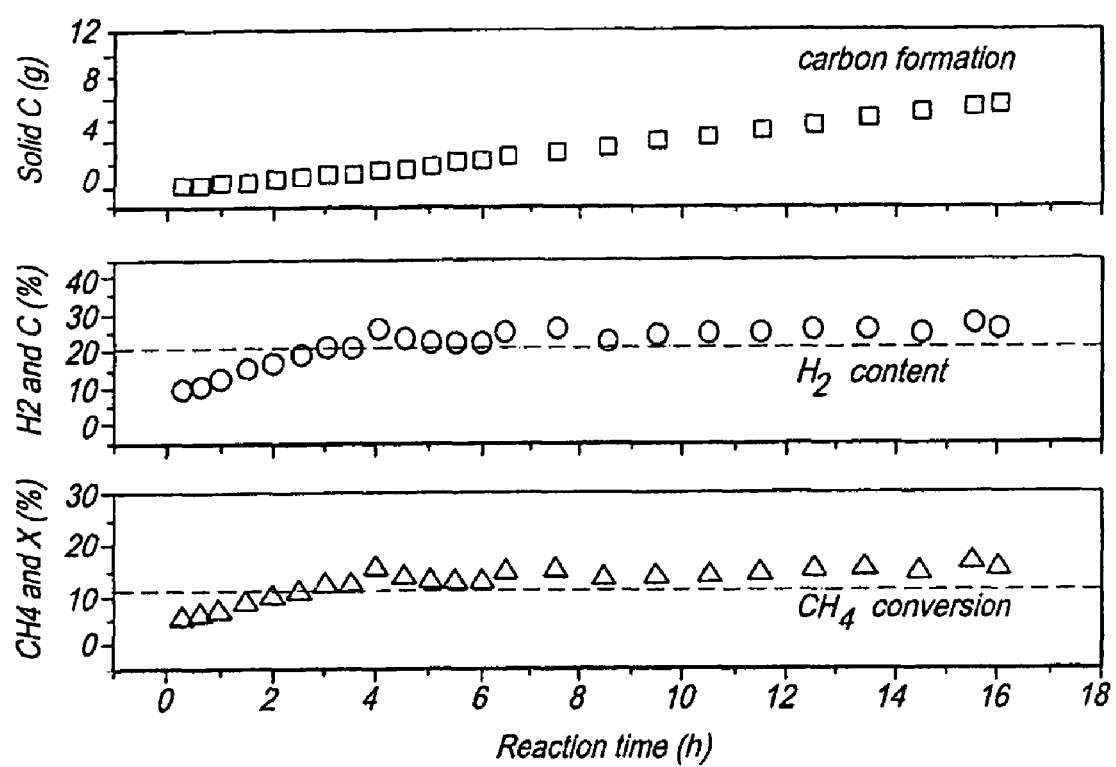
FIG. 4 is an overlaid graph illustrating $CH_4$ conversion, $H_2$ content, and carbon formation versus reaction time for Example 2 using a Ni81Al catalyst.

FIG. 4 illustrates the results of $CH_4$ conversion assisted by microwave heating using Ni81Al as the catalyst 56 (FIG. 2). Example 2 was a continuous process. In FIG. 4, the reaction time in hours (h) denotes the length of time that the process was performed.

In FIG. 4 there are three separate graphs. The lower graph plots the conversion rate "X %" of the $CH_4$ on the y-axis (expressed as a volume percentage) versus the reaction time in hours on the x-axis. The middle graph plots the content "C %" of $H_2$ on the y-axis (expressed as a volume percentage) versus the reaction time in hours on the x-axis. The upper graph plots the amount of solid carbon (Solid C (g)) on the y-axis (expressed in grams) versus the reaction time in hours on the x-axis.

From these two examples it was determined that a product gas containing 30% by volume of $H_2$ can be produced continuously and stably by microwave heating a Ni54Cu27Al catalyst. A product gas containing 20% by volume of $H_2$ can be produced continuously and stably by microwave heating a Ni81Al catalyst.

Alternate Embodiment Method for Producing Pure Hydrogen

An alternate embodiment of the method includes the additional step of further processing the product gas to recover hydrogen in substantially pure form. One method for recovering pure hydrogen is to flow the product gas under a vacuum through a Pd/Ag membrane coated on a porous metal or ceramic substrate. U.S. Pat. No. 6,165,438, to Willms et al., which is incorporated herein by reference, discloses an apparatus and method for the recovery of hydrogen from a gas containing hydrocarbons.

Alternate Embodiment Method for Producing both a Hydrogen Enriched Fuel and Carbon Nanotubes (CNTs)

Another alternate embodiment of the method produces both a hydrogen enriched fuel and carbon nanotubes (CNTs). This method requires the use of a catalyst mixture which includes an Fe based catalyst mixed with carbon. In addition, this method requires that the catalyst be pretreated in the reaction chamber 12 (FIG. 2) using microwave irradiation and exposure to $CH_4$ or $H_2$. Examples 3-5 to follow employ this method. Examples 3 and 4 produce multi walled carbon nanotubes (MWNTs). Example 5 produces single walled carbon nanotubes (SWNTs). For producing single walled carbon nanotubes (SWNTs), the method also requires that the feed gas into the reactor 12 (FIG. 2) includes both a methane gas and a pure hydrogen gas.

Catalyst samples for Examples 3-5 were prepared by the coprecipitation method. Catalyst samples employed and their composition are shown in Table 2.

TABLE 2

| Catalyst samples and their composition | |
|---|---|
| Catalyst samples | Composition |
| FeAl | 61 wt. % $Fe_2O_3$-39 wt. % $Al_2O_3$ |
| Fe3Al | 82 wt. % $Fe_2O_3$-18 wt. % $Al_2O_3$ |
| Fe2CuAl | 56 wt. % $Fe_2O_3$-26 wt. % CuO-18 wt. % $Al_2O_3$ |
| Fe2NiAl | 55 wt. % $Fe_2O_3$-27 wt. % CuO-18 wt. % $Al_2O_3$ |
| 1.2 wt % $Fe_2O_3$/MgO | 1.2 wt. % $Fe_2O_3$-98.8 wt. % MgO |

Feed Gases.

a. In Examples 3 and 4 for producing multi walled carbon nanotubes (MWNTs), a feed gas in the form of $CH_4$ at a flow rate of 120 ml/min was used.
b. In Example 5 for producing single walled carbon nanotubes (SWNTs), a feed gas included a mixture of $CH_4$ at a flow rate of 60 ml/min combined with $H_2$ at a flow rate of 60 ml/min.

The catalysts in Examples 3-5 were subjected to a pretreatment step performed in the reactor 12 (FIG. 2). Catalyst samples were in an oxide state, and during pretreatment, were mixed with carbon and reduced with $CH_4$ or $H_2$. The catalyst mixture was induced at a higher microwave forward power (300-1000 W), followed by reduction at a lower power (200 to 450 W) in the presence of $CH_4$ or $H_2$. Vacuum is not needed for the pre-treatment, as atmosphere pressure can be employed.

The following operating conditions were employed in Examples 3-5.

Reaction pressure: atmosphere pressure.

Forward power for reaction: 220-650 W.

Sample amount: mixture of 600 mg catalyst and 400 mg solid carbon.

System 10 (FIG. 2) is configured as previously described.

Example 3 For Producing a Hydrogen Enriched Fuel and Multi Walled Carbon Nanotubes (MWNTs)

Steps:
(1) 600 mg of $Fe_3Al$ catalyst was mixed with 400 mg of solid carbon, then the mixture was moved to the catalyst quartz holder.
(2) Pretreatment: the catalyst mixture (catalyst and carbon) was firstly induced at 500 W forward power for a couple of minutes, followed by reduction at 325 W in the presence of $CH_4$.
(3) Reaction: the power was controlled in the range of 325-365 W for the reaction and the temperature was kept around 850-900° C. The feed gas was pure $CH_4$. The flow rate was 120 ml/min.

Figure 5:
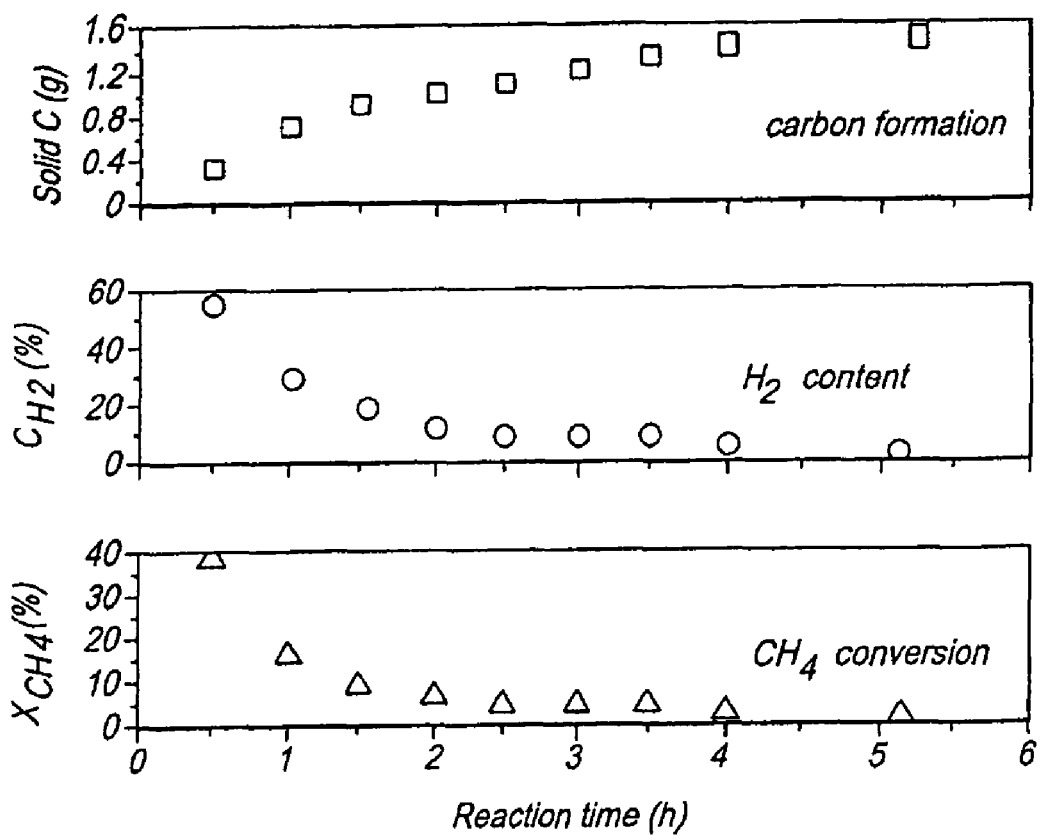
FIG. 5 is an overlaid graph illustrating carbon formation, $H_2$ content and $CH_4$ conversion for an alternate embodiment method of Example 3 in which both a hydrogen enriched fuel and carbon nanotubes are produced.
Figure 6:
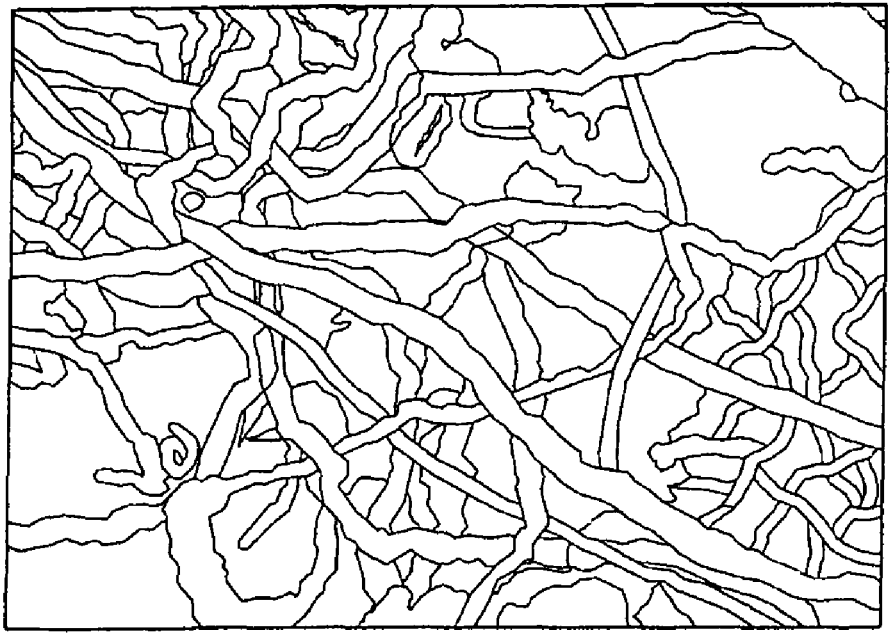
FIG. 6 is a transmission electron microscopic image illustrating carbon nanotubes produced by the method of Example 3.

FIG. 5 illustrates the results of the method of Example 3 for producing a hydrogen enriched fuel and multi walled carbon nanotubes (MWNTs) from methane decomposition using microwave heating and an $Fe_3Al$ catalyst. In Example 3, the weight of the catalyst was 600 mg; the weight of the catalyst mixture was 1000 mg; the flow rate of pure $CH_4$ was 120 ml/minute; the microwave power output was 325-365 W. In FIG. 5, $X_{CH4}$ represents the $CH_4$ conversion, $C_{H2}$ represents the $H_2$ volume percentage in the outlet gas, and Solid C represents carbon formation in grams. FIG. 6 illustrates the multi walled carbon nanotubes (MWNTs) produced by the method of Example 3.

At the beginning of Example 3, the conversion of $CH_4$ was about 35% and a product gas containing about 52% $H_2$ could be obtained, then after 2 hours, the conversion of $CH_4$ decreased to about 8% and the $H_2$ content of the corresponding product gas was about 15%. The conversion of $CH_4$ could be maintained at about 8% for about 2 hours and then decreased again. The solid carbon produced in these conditions included multi-walled carbon nanotubes (MWNT) having a diameter between about 10-40 nm.

Example 4 For Producing a Hydrogen Enriched Fuel and Multi Walled Carbon Nanotubes (MWNTs)

Steps:
(1) A catalyst mixture of 600 mg of $Fe_2NiAl$ catalyst and 400 mg of solid carbon was placed into the catalyst quartz holder.
(2) Pretreatment: the catalyst mixture (catalyst with carbon) was firstly induced at 300 W forward power for a couple of minutes, followed by reduction at 220 W in the presence of $CH_4$.
(3) Reaction: the power was controlled in the range of 220-300 W for the reaction and the temperature was kept around 750-850° C. The feed gas was pure $CH_4$. The flow rate was 120 ml/min.

FIG. 7 illustrates the results of the method of Example 4 for producing a hydrogen enriched fuel and multi walled carbon nanotubes (MWNTs) from methane decomposition using microwave heating and an $Fe_2NiAl$ catalyst. In Example 4, the weight of the catalyst was 600 mg; the weight of the catalyst mixture was 1000 mg; the flow rate of pure $CH_4$ was 120 ml/minute; the microwave power output was 220-300 W. In FIG. 7, $X_{CH4}$ represents the $CH_4$ conversion, $C_{H2}$ represents the $H_2$ volume percentage in the outlet gas, and Solid C represents carbon formation in grams. FIGS. 8A and 8B illustrate the multi walled carbon nanotubes (MWNTs) produced by the method of Example 4.

At the beginning of Example 4, the conversion of $CH_4$ was about 33% and a product gas containing about 50% $H_2$ could be obtained, then after 5 hours, the conversion of $CH_4$ decreased to about 10% and the $H_2$ content of the corresponding product gas was about 18%. The conversion of $CH_4$ could be maintained at about 10% for about 15 hours and then decreased again. The solid carbon produced in these conditions included multi-walled carbon nanotubes (MWNT) having a diameter between about 10-40 nm.

Example 5 For Producing a Hydrogen Enriched Fuel and Single Walled Carbon Nanotubes (SWNTs)

Steps:
(1) A catalyst mixture of 600 mg of 1.2 wt % $Fe_2O_3/MgO$ catalyst and 400 mg of solid carbon was placed into the catalyst quartz holder.
(2) Pretreatment: the catalyst mixture (catalyst with carbon) was firstly induced at 500 W forward power for a couple of minutes, followed by reduction at 430 W in the presence of $CH_4/H_2$ at a volumetric ratio of 1:1.
(3) Reaction: the power was controlled in the range of 430-650 W for the reaction and the temperature was kept around 900-1000° C. The feed gas was a mixture of $CH_4/H_2$ at a volumetric ratio of 1:1. The total flow rate was 120 ml/min.

Figure 9:
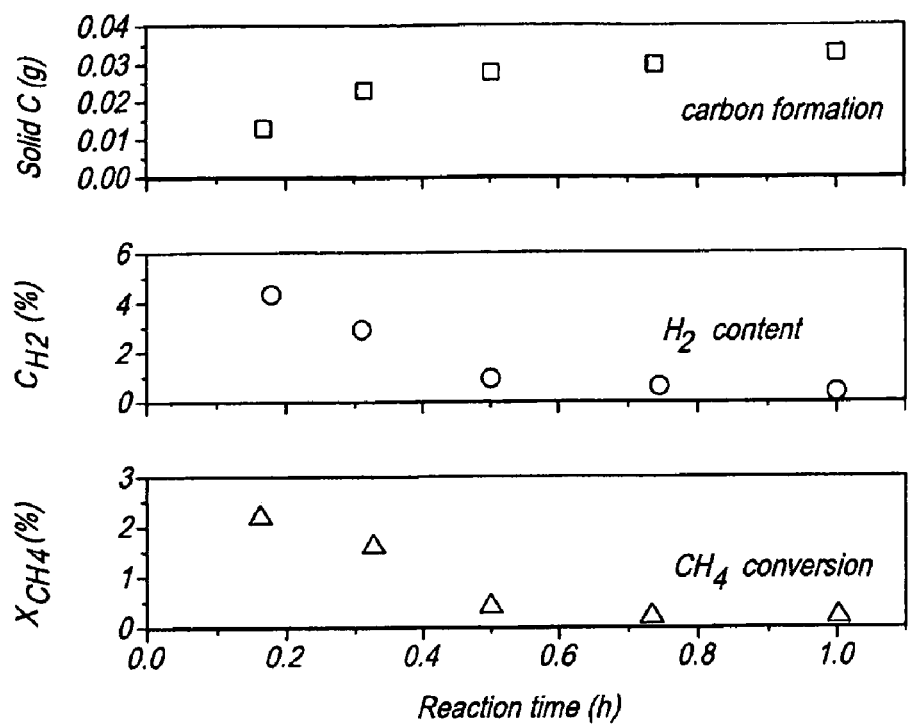
FIG. 9 is an overlaid graph illustrating carbon formation, $H_2$ content and $CH_4$ conversion for an alternate embodiment method of Example 5 in which both a hydrogen enriched fuel and carbon nanotubes are produced.
Figure 10A:
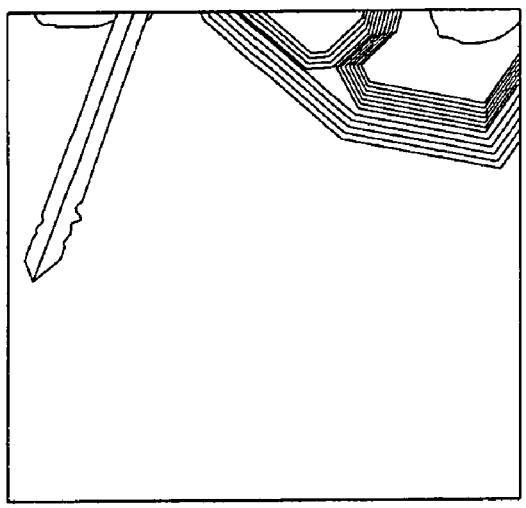
FIG. 10A is a transmission electron microscopic image illustrating carbon nanotubes produced by the method of Example 5.
Figure 10B:
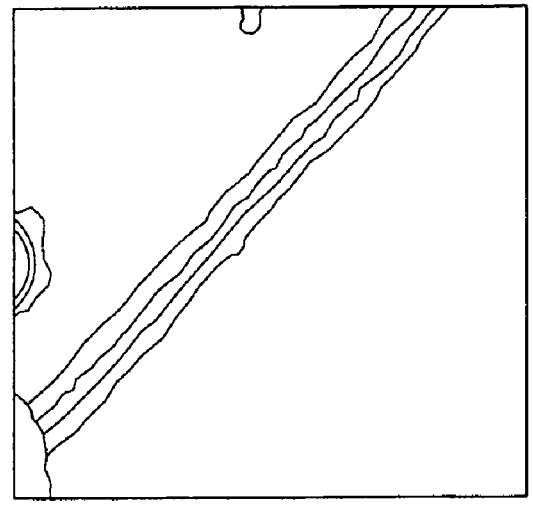
FIG. 10B is a transmission electron microscopic image illustrating carbon nanotubes produced by the method of Example 5.

FIG. 9 illustrates the results of the method of Example 5 for producing a hydrogen enriched fuel and single walled carbon nanotubes (SWNTs) from methane decomposition using microwave heating and a 1.2 wt % $Fe_2O_3/MgO$ catalyst. In Example 5, the weight of the catalyst was 600 mg; the weight of the catalyst mixture was 1000 mg; the flow rate of pure $CH_4$ was 60 ml/minute; the flow rate of pure $H_2$ was 60 ml/minute; the microwave power output was 430-650 W. In FIG. 9, $X_{CH4}$ represents the $CH_4$ conversion, $C_{H2}$ represents the $H_2$ volume percentage formed from $CH_4$ decomposition in the outlet gas, and Solid C represents carbon formation in grams. FIGS. 9A and 9B illustrate the single walled carbon nanotubes (SWNTs) produced by the method of Example 5.

At the beginning of Example 5, the conversion of $CH_4$ was about 2.5% and a product gas containing about 5% $H_2$ could be obtained, then after 0.5 hours, the conversion of $CH_4$ decreased to about 0.3% and the $H_2$ content of the corresponding product gas was about 0.005%. The solid carbon produced in these conditions included single walled carbon nanotubes (SWNTs) having a diameter between about 5-30 nm.

Thus the disclosure describes an improved method and system for producing a hydrogen enriched fuel. While the description has been with reference to certain preferred embodiments, as will be apparent to those skilled in the art, certain changes and modifications can be made without departing from the scope of the following claims.

What is claimed is:

1. A method for producing a hydrogen enriched fuel and carbon nanotubes comprising:
   providing a reactor having a microwave transparent wall;
   providing a flow of methane gas into the reactor;
   preparing Fe based catalyst particles from a catalyst precursor by coprecipitation of an aqueous solution;
   mixing the catalyst particles with carbon to form a catalyst mixture;
   placing the catalyst mixture in the reactor on a microwave transparent holder configured to allow the flow of methane gas to pass through the holder and around the catalyst mixture;
   pretreating the catalyst mixture in the reactor using microwave irradiation at a first microwave power directed through the wall of the reactor and the holder and the flow of methane gas through the holder;
   heating the catalyst mixture in the reactor at a pressure of about 1 atmosphere using microwave irradiation at a second microwave power less than the first microwave power directed through the wall of the reactor and the holder;
   directing the flow of methane gas through the holder and around the catalyst mixture; and
   controlling the second microwave power to produce the carbon nanotubes and a product gas comprising from about 15% to 20% hydrogen by volume, and from about 80% to 85% methane by volume.

2. The method of claim 1 wherein the first microwave power is between 300-1000W and the second microwave power is between 220-650 W.

3. The method of claim 1 further comprising providing a flow of hydrogen gas in combination with the flow of methane gas, and wherein the carbon nanotubes comprise single walled carbon nanotubes (SWNTs).

4. The method of claim 1 wherein the providing the flow of methane gas step is performed at about room temperature, and the heating step is performed at a temperature of from about 750-900° C.

5. The method of claim 1 wherein the catalyst particles have a diameter of from 74 μm to 140 μm and comprise a compound selected from the group consisting of FeAl; $Fe_3Al$, $Fe_2CuAl$, $Fe_2NiAl$, and $Fe_2O_3/MgO$.

6. A method for producing a hydrogen enriched fuel and carbon nanotubes comprising:
   providing a reactor having a microwave transparent wall;
   providing a flow of methane gas and a flow of hydrogen gas into the reactor;
   preparing Fe based catalyst particles from a catalyst precursor by coprecipitation of an aqueous solution;
   mixing the catalyst particles with carbon to form a catalyst mixture;
   placing the catalyst mixture in the reactor on a microwave transparent holder configured to allow the flow of methane gas and the flow of hydrogen gas to pass through the wall of the reactor and the holder and around the catalyst mixture;
   pretreating the catalyst mixture using microwave irradiation at a first microwave power directed through the wall of the reactor and the reactor and the flow of methane gas directed through the holder;
   heating the catalyst mixture in the reactor using microwave irradiation at a pressure of about 1 atmosphere and a second microwave power less than the first microwave power directed through the wall of the reactor and the holder;
   directing the flow of methane gas and the flow of hydrogen gas through the holder and around the catalyst mixture; and
   controlling the second microwave power to produce a product gas comprising from about 15% to 20% hydrogen en by volume, and from about 80% to 85% methane by volume, and single walled carbon nanotubes (SWNTs).

7. The method of claim 6 wherein the flow of methane gas and the flow of hydrogen gas are provided in a ratio of about one to one.

8. The method of claim 6 wherein the catalyst particles have a diameter of from 74 μm to 140 μm and comprise a compound selected from the group consisting of FeAl; $Fe_3Al$, $Fe_2CuAl$, $Fe_2NiAl$, and $Fe_2O_3/MgO$.

9. The method of claim 6 wherein the first microwave power is between 300-1000 W and the second microwave power is between 220-650 W.

10. The method of claim 6 wherein the pretreating step is performed at the first microwave power for at least a minute followed by reduction to the second microwave power.

11. The method of claim 6 wherein the heating step is performed at a temperature of from about 750-900° C.

12. A method for producing a hydrogen enriched fuel and carbon nanotubes comprising:
   providing a reactor having a microwave transparent wall;
   providing a flow of methane gas into the reactor;
   preparing catalyst particles from a catalyst precursor by coprecipitation of an aqueous solution, the catalyst particles comprising a compound selected from the group consisting of FeAl; $Fe_3Al$, $Fe_2CuAl$, $Fe_2NiAl$, and $Fe_2O_3/MgO$;
   mixing the catalyst particles with carbon to form a catalyst mixture;
   placing the catalyst mixture in the reactor on a microwave transparent holder configured to allow the flow of methane gas to pass through the wall of the reactor and the holder and around the catalyst mixture;
   pretreating the catalyst mixture in the reactor using microwave irradiation at a first microwave power directed through the wall of the reactor and the holder and the flow of methane gas directed through the holder;
   heating the catalyst mixture in the reactor at a temperature between from about 750-900° C. and a pressure of about 1 atmosphere using microwave irradiation at a second microwave power less than the first microwave power directed through the wall of the reactor and the holder;
   directing the flow of methane gas through the holder and around the catalyst mixture; and controlling the second microwave power to produce a product gas comprising the carbon nanotubes, hydrogen of from about 15% to 20% by volume, and methane of from about 80% to 85% by volume.

13. The method of claim 12 wherein the first microwave power is about 500 W and the second microwave power is from about 325-365 W.

14. The method of claim 12 further comprising providing a flow of hydrogen gas in combination with the flow of methane gas, and wherein the carbon nanotubes comprise single walled carbon nanotubes (SWNTs).

15. The method of claim 12 wherein the providing the flow of methane gas step is performed at about room temperature and at about 1 atmosphere.

* * * * *